US011075688B2

(12) United States Patent
Aryafar et al.

(10) Patent No.: US 11,075,688 B2
(45) Date of Patent: Jul. 27, 2021

(54) IN-BAND FULL DUPLEX RELAY TO ENHANCE UPLINK PERFORMANCE IN HETEROGENEOUS NETWORK

(71) Applicant: Apple Inc., Cupertino, CA (US)

(72) Inventors: Ehsan Aryafar, San Jose, CA (US); Ping Wang, San Jose, CA (US); Nageen Himayat, Fremont, CA (US); Shilpa Talwar, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 142 days.

(21) Appl. No.: 16/094,830

(22) PCT Filed: May 19, 2016

(86) PCT No.: PCT/US2016/033359
§ 371 (c)(1),
(2) Date: Oct. 18, 2018

(87) PCT Pub. No.: WO2017/200545
PCT Pub. Date: Nov. 23, 2017

(65) Prior Publication Data
US 2019/0123806 A1   Apr. 25, 2019

(51) Int. Cl.
| | | |
|---|---|---|
| *H04B 7/155* | (2006.01) | |
| *H04B 17/318* | (2015.01) | |
| *H04B 17/336* | (2015.01) | |
| *H04W 36/04* | (2009.01) | |
| *H04W 84/04* | (2009.01) | |
| *H04L 1/06* | (2006.01) | |
| *H04L 5/14* | (2006.01) | |

(52) U.S. Cl.
CPC ......... *H04B 7/15592* (2013.01); *H04B 7/155* (2013.01); *H04B 17/318* (2015.01); *H04B 17/336* (2015.01); *H04L 1/0693* (2013.01); *H04L 5/14* (2013.01); *H04W 36/04* (2013.01); *H04W 84/045* (2013.01)

(58) Field of Classification Search
CPC combination set(s) only.
See application file for complete search history.

(56) References Cited

U.S. PATENT DOCUMENTS 10,063,364 B2 *   8/2018   Khandani ............. H04L 5/1423
2004/0198467 A1   10/2004   Orlik et al.
(Continued)

OTHER PUBLICATIONS

International Search Report and Written Opinion dated Feb. 20, 2017, on application No. PCT/US2016/033359.
(Continued)

*Primary Examiner* — Yee F Lam
(74) *Attorney, Agent, or Firm* — Kowert, Hood, Munyon, Rankin & Goetzel, P.C.

(57) ABSTRACT

An apparatus of a base station in a network may include a memory device and a processing device operatively coupled to the memory device. The processing device may process a message received at the base station from a macro-cell base station. The message may include a request to act as a relay for a user equipment (UE). The processing device may then determine that the base station is to act as a relay for the UE. The processing device may then generate a message comprising an indication that the base station accepted the request to act as a relay for the UE.

20 Claims, 8 Drawing Sheets

(56) References Cited

U.S. PATENT DOCUMENTS

| | | |
|---|---|---|
| 2009/0227258 A1 | 9/2009 | Youn et al. |
| 2009/0285088 A1* | 11/2009 | Feng ............... H04B 7/15507 370/216 |
| 2010/0110968 A1 | 5/2010 | Lee et al. |
| 2010/0150103 A1* | 6/2010 | Womack ........... H04W 74/0866 370/331 |
| 2012/0034925 A1* | 2/2012 | Noh ................ H04W 36/30 455/444 |
| 2012/0051349 A1* | 3/2012 | Teyeb .............. H04W 36/02 370/338 |
| 2012/0142357 A1* | 6/2012 | Aminaka .......... H04W 36/0055 455/437 |
| 2012/0170508 A1 | 7/2012 | Sawai |
| 2012/0172045 A1* | 7/2012 | Fukuta .............. H04W 36/32 455/440 |
| 2012/0201318 A1* | 8/2012 | Seo .................. H04L 5/0048 375/260 |
| 2013/0003650 A1* | 1/2013 | Han .................. H04B 7/155 370/315 |
| 2013/0079018 A1* | 3/2013 | Teyeb .............. H04W 36/0055 455/441 |
| 2013/0100988 A1* | 4/2013 | Miyoshi ............ H04B 7/15528 375/211 |
| 2013/0163509 A1* | 6/2013 | Kim ................. H04W 88/04 370/315 |
| 2013/0229939 A1* | 9/2013 | Teyeb .............. H04W 36/30 370/252 |
| 2013/0279364 A1 | 10/2013 | Nagata et al. |
| 2013/0301517 A1 | 11/2013 | Chang et al. |
| 2013/0331093 A1* | 12/2013 | Cho ................. H04W 88/04 455/426.1 |
| 2014/0003264 A1* | 1/2014 | Shin ................. H04B 7/15592 370/252 |
| 2014/0024375 A1* | 1/2014 | Fitzpatrick ........ H04W 36/0083 455/436 |
| 2014/0036786 A1 | 2/2014 | Kazmi et al. |
| 2014/0038598 A1* | 2/2014 | Ren ................. H04W 48/16 455/434 |
| 2014/0079026 A1* | 3/2014 | Dimou .............. H04W 36/20 370/332 |
| 2014/0161024 A1* | 6/2014 | Speight ............. H04W 52/04 370/315 |
| 2014/0274060 A1* | 9/2014 | Fujishiro .......... H04W 36/0055 455/436 |
| 2014/0349647 A1* | 11/2014 | Chen ................ H04W 36/30 455/436 |
| 2015/0017941 A1* | 1/2015 | Doberstein ........ H04L 1/0045 455/296 |
| 2015/0071132 A1 | 3/2015 | Mikhemar et al. |
| 2015/0222336 A1* | 8/2015 | Yilmaz .............. H04B 7/024 370/252 |
| 2015/0358055 A1* | 12/2015 | Molisch ............ H04B 7/0413 370/329 |
| 2016/0014626 A1* | 1/2016 | Yi .................... H04J 11/0053 370/252 |
| 2016/0037425 A1* | 2/2016 | Van Lieshout ....... H04W 36/30 370/332 |
| 2016/0157254 A1* | 6/2016 | Novlan .............. H04W 72/10 370/329 |
| 2016/0212775 A1* | 7/2016 | Xu .................... H04W 76/10 |
| 2016/0249390 A1* | 8/2016 | Hans ................. H04W 68/02 |
| 2017/0034841 A1* | 2/2017 | Bethanabhotla ...... H04L 5/0048 |
| 2017/0048896 A1* | 2/2017 | Ayadurai ........... H04W 48/20 |
| 2018/0123683 A1* | 5/2018 | Wakabayashi ..... H04B 7/15528 |
| 2018/0138965 A1* | 5/2018 | Martin ............. H04B 7/15507 |

OTHER PUBLICATIONS

Agapi Mesodiakaki et al., Joint Uplink and Downlink Cell Selection in Cognitive Small Cell Heterogeneous Networks, In: 2014 IEE Global Communications Conference (GLOBECOM), Feb. 12, 2015 (http://ieeexplore.ieee.org/document/7037206/) See abstract; p. 2, left-column, line 50-p. 5, left-column, line 27; and figure 1.

3GPP TS 36.300 Evolved Universal Terrestrial Radio Access (E-UTRA) and Evolved Universal Terrestrial Radio Access Network (E-UTRAN). Apr. 3, 2017.

D. Bharadia, et. al., "FastForward: Fast and Constructive Full Duplex Relays", ACM SIGCOMM 2014.

3GPP WID REL-10 RP-091434, "Relays for LTE," Dec. 2009.

3GPP TR 36.814 v1.6.0, "Further Advancements for E-UTRA Physical Layer Aspects", Jan. 2010.

Iwamura M, Takahashi H, Nagata S. Relay technology in LTE-advanced. NTT DoCoMo Technical Journal. Sep. 1, 2010;12(2)29-36.

Aryafar E, Khojastepour MA, Sundaresan K, Rangarajan S, Chiang M. MIDU: Enabling MIMO full duplex. InProceedings of the 18th annual international conference on Mobile computing and networking Aug. 22, 2012 (pp. 257-268). ACM.

M.K. Karakayali et al., "Network coordination for spectrally efficient communications in cellular systems" IEEE Wireless Communications (vol. 13, Issue: 4, Aug. 2006) pp. 56-61.

K. Balachandran et al., "NICE: A Network Interference Cancellation Engine for Opportunistic Uplink Cooperation in Wireless Networks" IEEE Transactions on Wireless Communications (vol. 10, Issue: 2, Feb. 2011) pp. 540-549.

Sivarama Venkatesan "Coordinating Base Stations for Greater Uplink Spectral Efficiency in a Cellular Network" 2007 IEEE 18th International Symposium on Personal, Indoor and Mobile Radio Communications, Date of Conference: Sep. 3-7, 2007.

Wei Hong et al., "Full Uplink Performance Evaluation of FDD/TDD LTE-Advanced Networks with Type-1 Relays" Published in: 2011 IEEE Vehicular Technology Conference (VTC Fall), Date of Conference: Sep. 5-8, 2011.

Jing Han et al., "Uplink Performance Evaluation of Wireless Self-Backhauling Relay in LTE-Advanced" Published in: 2010 6th International Conference on Wireless Communications Networking and Mobile Computing (WiCOM), Date of conference: Sep. 23-25, 2010.

\* cited by examiner

IN-BAND FULL DUPLEX RELAY TO ENHANCE UPLINK PERFORMANCE IN HETEROGENEOUS NETWORK

BACKGROUND

The disclosure relates to the field of wireless communications, including control and operation of network connections by user equipment.

BRIEF DESCRIPTION OF THE DRAWINGS

Various embodiments of the present disclosure will be understood more fully from the detailed description given below and from the accompanying drawings of various embodiments of the disclosure.

DESCRIPTION OF EMBODIMENTS

Figure 1:
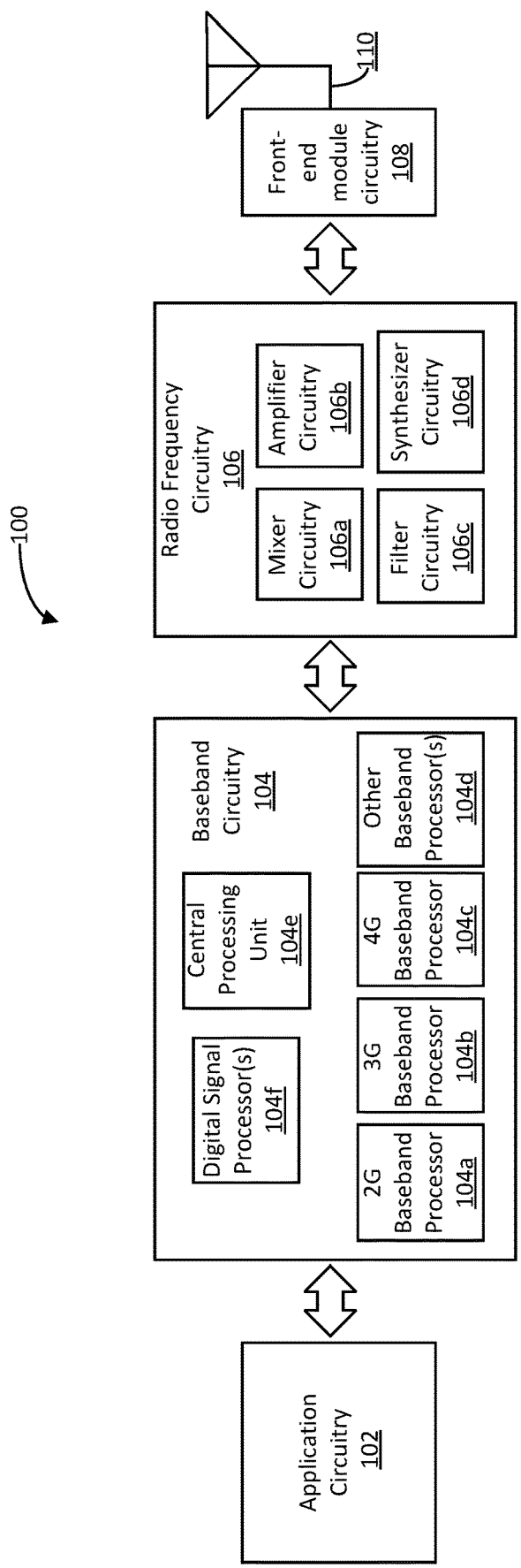
FIG. 1 is a block diagram illustrating components of an electronic device implementing aspects of the disclosure, according to an embodiment.

User equipment (UE) accessing a heterogeneous network (HetNet) may receive a stronger downlink signal from a macro-cell than from a small-cell that is nearer to the UE. Thus, the UE may maintain a primary point of association with the network through the macro-cell with a stronger transmission signal. However, the due to the position of the UE, the small-cell may be closer to the UE and a better candidate station for uplink transmission. Therefore, in some networks, the UE may utilize the small-cell to relay uplink information to the macro-cell from the UE.

HetNets are network that have cells of different sizes or capabilities. For example, cell base stations in a HetNet may have different transmission powers. Large base stations having strong transmission powers may be referred to as macro-cells. For example, macro-cells may have power outputs on the order of tens of watts and cover a range of tens of kilometers. In various embodiments, power outputs of macro-cells may have different power and coverage ranges. Smaller base stations that do not have as strong of transmission powers may be referred to as small-cells. In heterogeneous networks, the transmission power of the macro-cell is may be much higher than a small-cell (e.g. 15-20 dB higher). Further, the coverage area for a small cell is typically lower and only users close to a small cell can decode downlink control channels from the small-cell in the presence of interference from the macro-cell.

As a UE is connected to a mobile network, it may track the signal strengths of various nearby base stations. As a candidate base station becomes strong enough compared to the current connected base station, a handover event may occur. The handover event may transition explicit signaling between the network and the UE to the new base station based on the signal strength. Thus, the new stronger transmitter becomes the primary point of association for the user.

This handoff procedure may not provide optimal performance for UEs in a HetNet. Instead, the large transmit power of a macro-cell compared to a small-cell may prevent a UE from transitioning to using the small-cell as a primary point of association. For example, the UE may measure a stronger signal from the macro-cell compared to the small-cell, even when the UE is near to the small-cell. Thus, the hand-off to a nearby small-cell may not occur.

As a result, in HetNets, there is an inherent link asymmetry where a UE may have a stronger downlink from a macro-cell, but may have a better uplink channel to a nearby small cell. For UEs having a macro-cell primary point of association which fail to handover to a nearby small cells, this may lead to a very poor uplink performance as such macro-cell UEs would have had a better uplink decoding opportunity if their signals are processed at the nearby small-cell with better channel conditions.

Some network attempt to expand the area of small-cells using cell range expansion (CRE) in order to associate UEs with a nearby small-cell instead of with a macro-cell that is further away, but provides a stronger downlink signal. In CRE, a network may use a small-cell as the primary point of association for a macro-cell that has a stronger measured signal. Due to the large macro-signal, however, the network may provide almost black sub-frames to reduce interference of control signals and downlink data to the UE. This may provide a better signal to the UE, but under-utilize uplink resources due to the blanking of downlink control channel transmissions to UEs. The problems may increase with additional blanked UEs.

Other networks may attempt to improve performance through coordinated multi-point transmission (CoMP) from the UE. For example, the UE may maintain a primary point of association with a macro-cell having a stronger downlink signal. The UE, however, may transmit data to the macro-cell, one or more nearby small-cells, or both. For example, the UE may transmit uplink data to a nearby small-cell and an associated macro-cell. The network may then decode the data together to process the uplink information. This may require additional network resource allocation by the macro-cell and the small-cell. In addition, there may be a heavy load on the backhaul due to the coordination of combining uplink data received from multiple points.

In order to improve operation of a HetNet for a UE, the network may enable the UE to maintain a primary point of association with a macro-cell having the strongest measured signal and use a small-cell to relay signals from the UE to the macro-cell during uplink transmissions from the UE. For example, the UE may receive signals and control data from a macro-cell. However, a small-cell may relay uplink signals received from the UE to the macro-cell. The signal may be relayed such that it constructively combines with the original UE signal when received at the macro-cell. For example, the small cell may generate the signal to the macro-cell so that the macro-cell receives the signal in phase with the signal from the UE. The small-cell transmission may use the same network resources as the UE and therefore the relayed signal would use no additional time or frequency resources.

In order to provide a relayed signal that constructively combines with the original UE signal at the macro-cell, the small-cell may have an in-band full-duplex antenna that receives the signal from the UE and transmits it to the macro-cell. In order to relay the signal to the macro-cell effectively, the relay may have a processing delay that is small enough such that the relayed signal does not fall outside of the cyclic prefix (CP) interval at the macro-cell. This prevents inter-symbol interference at the macro-cell. For example, an aggregate processing delay of less than 100 ns may be within the CP of both WiFi and LTE networks. In addition, the received signal at the small-cell may be processed intelligently such that the relayed signal constructively combines with the original signal when received at the macro-cell.

To relay the signal from the UE to constructively combine at the macro-cell, the relay may collect channel state information (CSI) about the network links involved. For example, the relay may collect CSI about the UE to macro-cell channel, the UE to small-cell channel, and the small-cell to macro-cell channel. Each of the small-cell, macro-cell, and UE may provide test signals to each other and monitor the signals received to determine the CSI for particular channels. For example, the small-cell may send a test signal that the UE monitors and determines changes to the amplitude and phase of the signal as it is received. This may establish the CSI between the small-cell and the UE. The small-cell, macro-cell, and UE may then share the CSI information with each other so that each channel so the small-cell can collect CSI information. Then, the small-cell can use that information to calibrate one or more filters such that the signal transmitted from the relay is received at the macro-cell such that the signals constructively combine.

For example, in some embodiments, the relay may amplify the signal received by the full-duplex antenna by amplitude A and apply a filter with response F to increase the signal to noise ratio received at the macro-cell. The response F may be a phase shift applied to the signal by the filter. The resulting signal to noise ratio may be represented as $$SNR = \left| \frac{h_{sd} + h_{rd}FAh_{sr}}{N_0} \right|^2.$$

Thus, the relay may use the CSI from the UE to the macro-cell ($h_{sd}$), the CSI from the small-cell to the macro-cell ($h_{rd}$), and the CSI from the UE to the macro-cell ($h_{sr}$) to calibrate a value of amplification A and/or filter response F to optimize signal to noise ration SNR in view of noise ($N_o$).

The small-cell may receive the various CSIs during a process of setting up the small-cell to act as a relay for uplink transmissions from the UE. The UE may determine that a small-cell is a candidate to act as a relay for uplink information based on analysis of signal measurements from nearby small-cells, a macro-cell acting as the primary point of association, and uplink rates for the UE. For example, if the UE is receiving a strong signal from a macro-cell, but is experiencing low uplink data bit-rates, the UE may search for nearby small-cells to act as a relay for uplink transmissions. If the UE detects a nearby small-cell with a full-duplex fast forwarding relay, the UE may determine that it is a candidate to act as a relay. In some embodiments, the UE may not have an indication of the relay capabilities of small-cells, but may identify candidates based on measured signal strength. The UE may then send a transmission to the macro-cell that indicates one or more nearby small-cell candidates and corresponding CSI.

In response to receiving the candidate small-cells from the UE, the macro-cell may determine whether to permit the UE to use a small-cell as a relay. If the macro-cell determines that a small-cell should act as a relay, the macro-cell may provide the small-cell with the UE scheduling information, CSI, and a request to act as a relay. As discussed above, the small-cell may use the CSI and the request to determine whether to act as a relay. The small-cell may use the scheduling information for the UE to determine if the resources allocated to the UE by the macro-cell are available at the small-cell. This may be used to determine whether to accept the request or may be used to reschedule another UE so the resources may be allocated to the UE making the request. The small-cell may then either accept or reject the request. If the request is rejected, the macro-cell may attempt to use a different small-cell. If the request is accepted, the small-cell may then act as a relay to receive signals from the UE, amplify and filter the signal, and transmit the modified signal to the macro-cell. The macro-cell may receive signals from the UE and the small-cell in a manner such that they combine constructively.

In some embodiments, the macro-cell and the small-cell may communicate with each other through a wired connection such as a wired x2 interface or other network backhaul. However, some connections may have higher latency than a wireless communications. Thus, to improve communications between the macro-cell and the small-cell, the base stations may communicate through an over-the-air wireless communication. For example, the network may leverage the in-band full-duplex nature of the small-cell to provide efficient communication to the small-cell from the macro-cell. For example, the macro-cell may schedule the small-cell on a resource block that the small-cell may potentially also use to transmit to any of its other UEs. The small cell then uses its full-duplex functionality to not only do downlink transmission to its associated UEs but also to receive the signals from the macro-cell. For example, the macro-cell may send signal with information including, requesting the small cell to relay uplink transmission of a UE, informing the small cell regarding various CSI, and other information relevant to relaying signals from the UE. These communications may be performed by the use of full duplex functionality at the small-cell, without having similar functionality at the macro-cell. In a similar manner, a small-cell may send a signal to a macro-cell leveraging the full-duplex functionality at the small cell. For example, the macro-cell may dedicate an uplink channel for the small-cell for transmission to the macro-cell. The small-cell may use the same resources to receive signals from one or more UEs associated with the small-cell.

In some embodiments, the small cell may reduce the impact of interference caused by its own clients to a UE for which it is relaying a signal. In particular, in response to the macro-cell informing the small-cell about resources that are dedicated to the UE's uplink signal, the small-cell can avoid scheduling any of its associated clients at that time. This may eliminate interference between the assisted UE and other UEs associated with the small-cell.

In some embodiments, a small-cell may use interference cancellation techniques to reduce interference. For example, the small-cell may perform successive interference cancellation to first decode the signal from an associated client, subtract from the overall received signal and then forward only the signal corresponding to the UE it intends to relay. This approach enhances spectral efficiency at the small-cell compared to the avoidance scheduling scheme discussed above. However, the relay performance might be reduced due to processing delays incurred from decoding signals and potential residual interference that was not completely canceled.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed disclosure. However, various aspects of the disclosed embodiments may be practiced in other examples that depart from these specific details. In certain instances, descriptions of well-known devices, circuits, and methods are omitted so as not to obscure the description of the present disclosure with unnecessary detail.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 illustrates, for one embodiment, example components of a UE device 100. In some embodiments, the UE device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuitry 104 may interface with the application circuitry 102 for generation and processing of the baseband signals and for controlling operations of the RF circuitry 106. For example, in some embodiments, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), preceding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP, NAS and/or RRC layers. In some embodiments, the baseband circuitry may include one or more audio digital signal processor(s) (DSP) 104f. The audio DSP(s) 104f may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SoC).

In some embodiments, the baseband circuitry 104 may provide for communication compatible with one or more radio technologies. For example, in some embodiments, the baseband circuitry 104 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature downconversion and/or upconversion respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a may be arranged for direct downconversion and/or direct upconversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into $N_d$ equal packets of phase, where $N_d$ is the number of delay elements in the delay line. In this way, the DLL provides negative feedback to help ensure that the total delay through the delay line is one VCO cycle.

In some embodiments, synthesizer circuitry 106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110).

In some embodiments, the UE device 100 may include additional elements such as, for example, memory/storage, display, camera, sensor, and/or input/output (110) interface.

Figure 2:
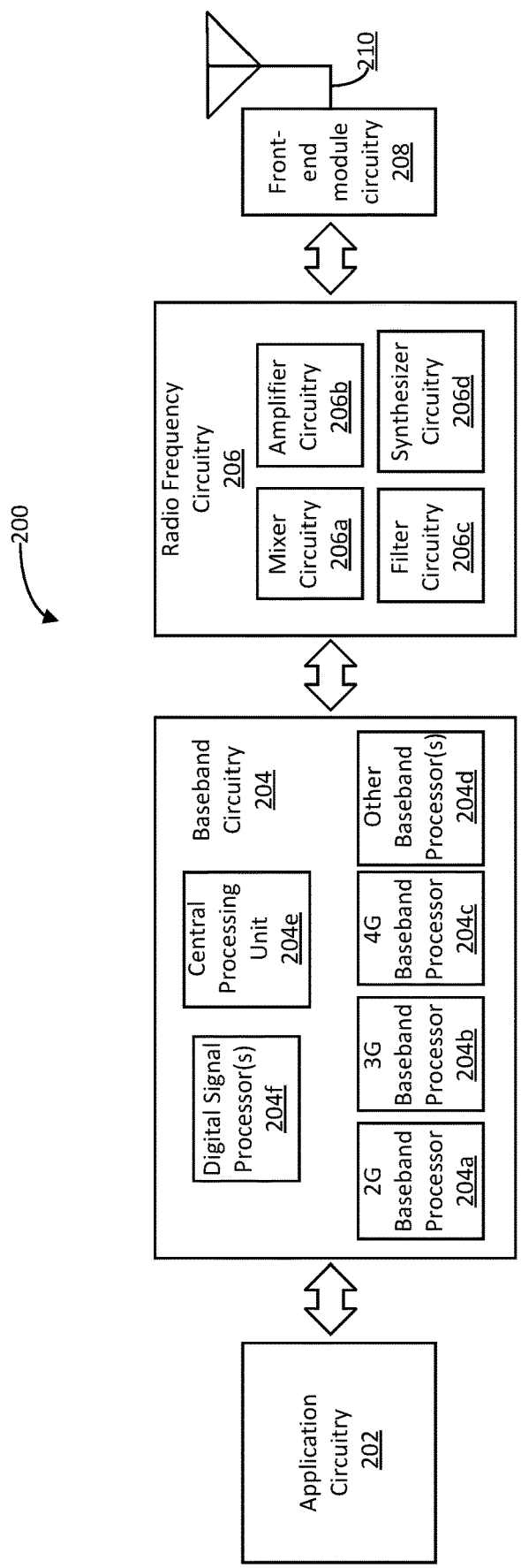
FIG. 2 is a block diagram illustrating components of an electronic device implementing aspects of the disclosure, according to an embodiment.

A small-cell base station may have similar components to those discussed with reference to FIG. 1. FIG. 2 illustrates, for one embodiment, example components of a small-cell base station 200 (referred to herein as small-cell 200) having a full-duplex antenna 210. In some embodiments, the small-cell 200 may include application circuitry 202, baseband circuitry 204, Radio Frequency (RF) circuitry 206, front-end module (FEM) circuitry 208 and one or more antennas 210, coupled together at least as shown. The components of small-cell 200 may perform operations similar to those of corresponding component of UE 100 discussed above. For example, baseband circuitry 204 of small-cell 200 may perform operations similar to those of baseband circuitry 104 of UE 100.

The components of small-cell 200 may also perform additional or different operations compared to those of UE 100 to enable the small-cell 200 to act as a relay for communications from a UE to a macro-cell. For example, the antenna 210 in FIG. 2 may be an in-band full-duplex antenna that enables receiving and transmitting signals at the same time at the same frequency spectrum. In addition, amplifier circuitry 206b may perform amplification of signals received from a UE to relay the signal to a macro-cell. The filter circuitry 206 may also perform filtering to adjust the phase of the relayed signal to add constructively with a signal from the UE at a macro-cell. In some embodiments, the amplification and filtering for relaying UE signals to a macro-cell may be performed by separate circuitry from the amplification circuitry 206b and filter circuitry 206c. In addition, the amplification and filtering for relaying UE signals may be performed by front-end module circuitry 208 instead of by radio frequency circuitry 206. Thus, the signal may be relayed quickly without additional processing by radio frequency circuitry 206. The small-cell 200 in FIG. 2 may be used to relay signals from a UE 100 as shown in FIG. 1 to a macro-cell to improve uplink communications from the UE. The baseband circuitry 204 may calibrate the amplification circuitry 206b and filter circuitry 206c such that signals relayed by the small-cell base station 200 are transmit to a macro-cell to combine constructively with signals received by the macro-cell directly from the UE.

Figure 3:
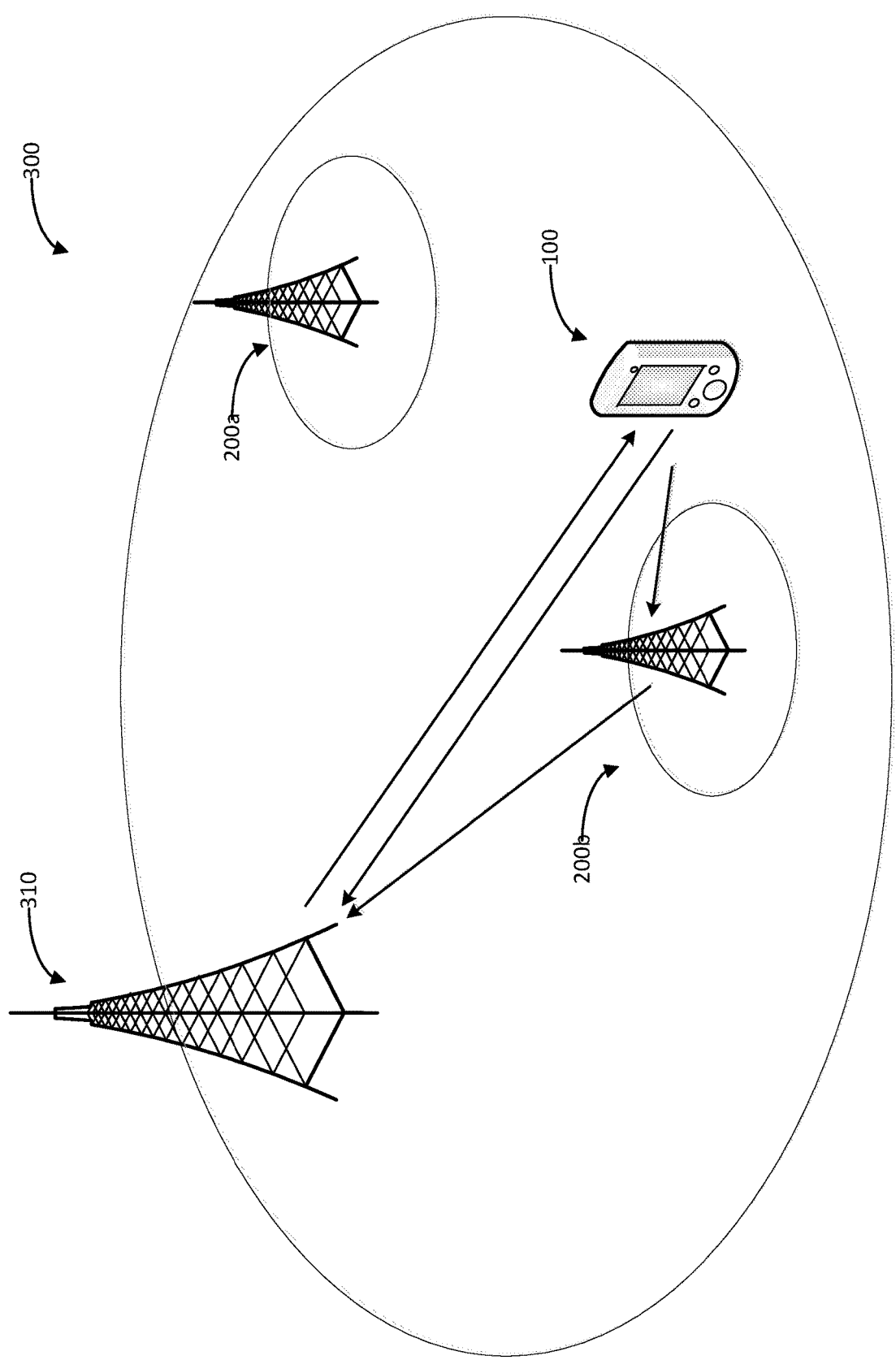
FIG. 3 is a block diagram illustrating components of a network, according to an embodiment.

FIG. 3 depicts an example network environment 300 having a macro-cell 310, small-cells 200a, 200b, and a UE 100. In the scenario depicted in FIG. 3, the UE 100 is closer to small-cell 200b than to macro-cell 310. Thus, the UE may have better uplink signal reception at the small-cell 200b than at macro-cell 310. However, the macro-cell 310 may be the primary point of association for the UE 100 because it has the stronger downlink reception for the UE. To improve communications for the UE, the network may maintain the macro-cell as the primary point of association for the UE such that the UE experiences the benefits of the stronger measured signal. For uplink transmissions, the small-cell 200b may receive the UE's transmission on a full-duplex antenna and act as a relay to transmit the received signal to the macro-cell.

Small-cell 200a may be closer to the UE than the macro-cell 310, but further than the small-cell 200b. Thus, the small-cell 200b may be selected by the network instead of small-cell 200a to act as a relay. If small-cell 200b denied the request to act as a relay, then the small-cell 200a may be used by the network as a relay for uplink transmissions from the UE 100.

Figure 4:
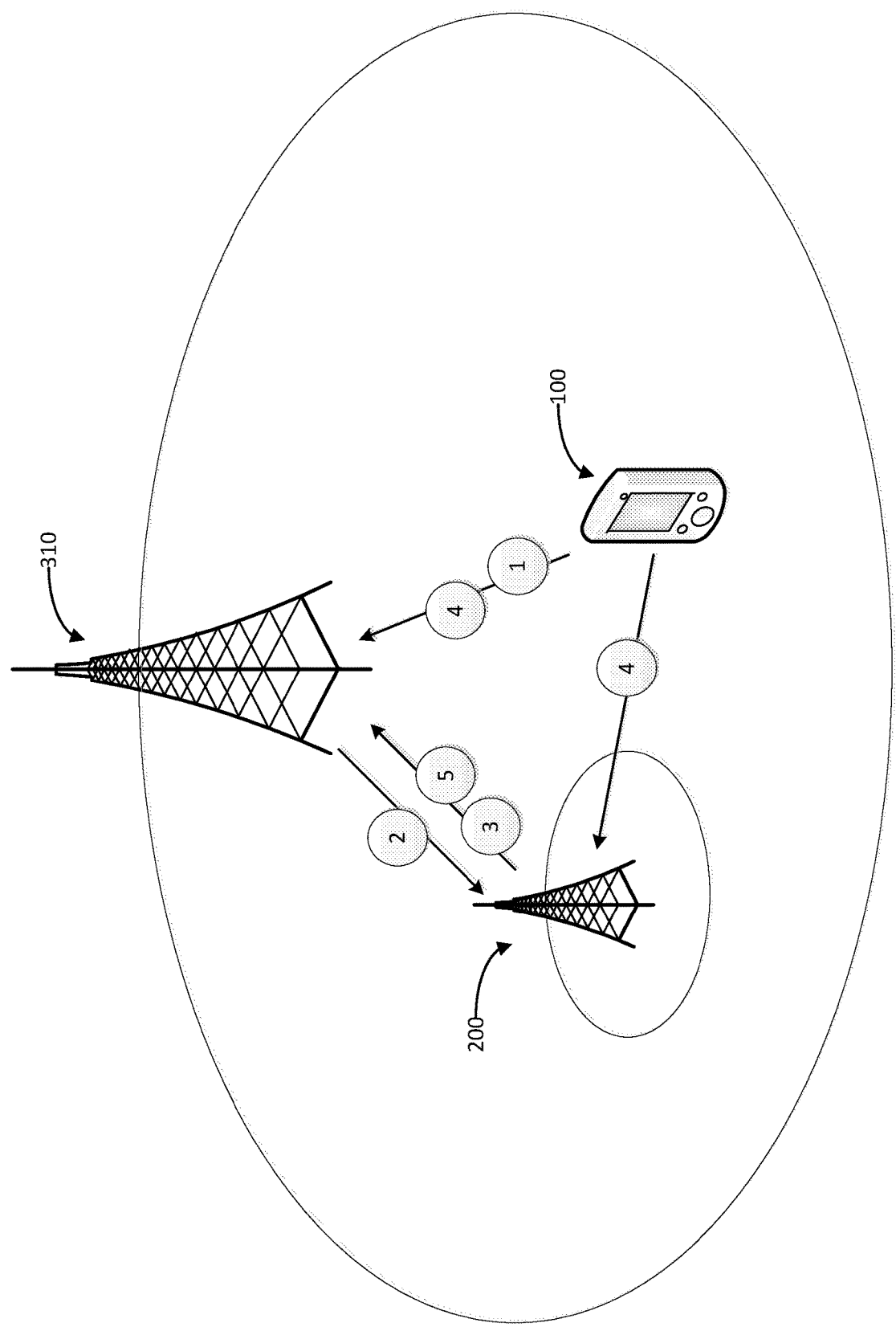
FIG. 4 is a block diagram illustrating components and communication of a network, according to an embodiment.

FIG. 4 is a diagram illustrating communications by a UE 100, a small-cell 200, and a macro-cell 310 to setup and use a small-cell 200 as a relay for uplink communications from UE 100. Beginning with communication 1, the UE 100 provides the macro-cell 310 with a list of nearby small-cells 200, the corresponding signal strength of the small-cells, or the corresponding CSI of the small-cells. The UE 100 may transmit communication 1 over a wireless connection between the UE 100 and the macro-cell 310. The UE 100 may generate and transmit communication 1 in response to determining that the uplink transmission signal to the macro-cell 310 is providing poor uplink performance. For example, if the uplink performance is significantly worse than the downlink performance, the UE 100 may determine that the uplink performance is poor. In addition, the UE 100 may take into account the signal strength of small-cells 200 nearby. The signal may include an indication of various small-cells 200 near the UE 100 or may include a small-cell 200 with the highest signal strength.

After receiving communication 1, the macro-cell 310 may determine if there is an appropriate small-cell 200 in the list of small-cells provided by the UE. The macro-cell 310 may select an appropriate small-cell 200 based on the small-cell to UE CSI, the small-cell to macro-cell CSI, the full-duplex relaying capabilities of the small-cell 200, strength of signals from network components, or other criteria indicative of the effectiveness of using a small-cell 200 as a relay device. After a small-cell 200 is selected by the macro-cell 310, the macro-cell may generate and send communication 2 to the small-cell 200. For example, the macro-cell 310 may send communication 2 to the small-cell 200 over a wired connection such as an x2 interface or another connection over the network backhaul. Communication 2 may include a request for the small-cell 200 to act as a relay for uplink signals from the UE 100. The request may include the UE's uplink scheduling information, UE to macro-cell CSI, small-cell to UE channel information, small-cell to macro-cell CSI, or other information about the connections of UE 100, macro-cell 310, or small-cell 200. The small-cell to UE CSI may be determined by the UE 100 based on signals from the small-cell 200 and shared with the small-cell 200 to inform the small-cell 200 of information to determine whether to accept the request. If the small-cell 200 accepts the request to act as a relay, it may update the small-cell to UE CSI based on signals received from the UE 100.

After receiving communication 2, the small-cell 200 determines whether to accept the request to act as a relay. For example, the small-cell 200 may accept or reject the request to act as a relay based on its current serving load, the CSI information provided by the macro-cell 310, the scheduling information for the UE 100, or other similar information. The small-cell 200 may send an indication of the acceptance or rejection of the request as communication 3 to the macro-cell 310. Communication 3 may be sent using the same x2 interface or other wired or wireless backhaul interface between the small-cell 200 and the macro-cell 310 that was used for communication 2. In some embodiments a different interface may be used for communication 3 than was used in communication 2.

If the small-cell 200 rejected the request, then the macro-cell 310 may attempt to setup another small cell to act as a relay for uplink signals from the UE 100. If the small-cell 200 accepted the request, then the small-cell 200 may update its network resource allocation to provide resources to the UE 100. For example, the small-cell 200 may provide time and frequency resources for the UE 100 at the time and frequency indicated by the macro-cell 310.

While the macro-cell 310 and small-cell 200 determined to setup a relay connection with small-cell 200, the UE 100 may continue to perform uplink and downlink communications through the network. Communication 4 is provided by the UE to the network. The communication may be an uplink transmission at the time and frequency allocated by the macro-cell 310. In some embodiments, the UE 100 may not receive any indication that the small-cell 200 is relaying signals to the macro-cell 310. Thus, the UE 100 transmits uplink signals at a time and frequency allocated by the macro-cell 310 in a manner as though the UE was only transmitting to the macro-cell 310 directly.

Upon receiving the uplink transmission of communication 4 from the UE 100, the small-cell 200 amplifies, filters, and transmits a modified signal to the macro-cell 310. The signal transmit from the small-cell 200 to the macro-cell 310 is represented as communication 5 in FIG. 4. For example, the small-cell may amplify the signal to produce a stronger signal at the receiver of macro-cell 310. In addition, the small-cell 200 may provide a filter that modifies the signal received from the UE 100 with a phase shift. The phase shift may be selected in a manner such that the macro-cell 310 receives the signal from the small-cell 200 in a manner that it adds constructively from the signal received directly from the UE 100. The processing performed by the small-cell 200 may be less than the CP of communications between the UE 100 and the macro-cell 310. Thus, the macro-cell 310 may receive communication 4 directly from the UE 100 and communication 5 relayed from the small-cell 200 without inter-symbol interference. For example, in an LTE network the CP length may be 400 ns. In order to ensure that the signal relayed from the small-cell 200 is received at the macro-cell 310 without inter-symbol interference, the processing performed by the full-duplex antenna and RF circuitry of the small-cell 200 may be performed in approximately 100 ns. Thus, in addition to the time it takes to perform processing related to relay operation, the signal may be delayed by 300 ns due to differences in the propagation path of signals directly from the UE 100 and the small-cell 200 and those relayed through the small-cell 200 without inter-symbol interference.

Figure 5:
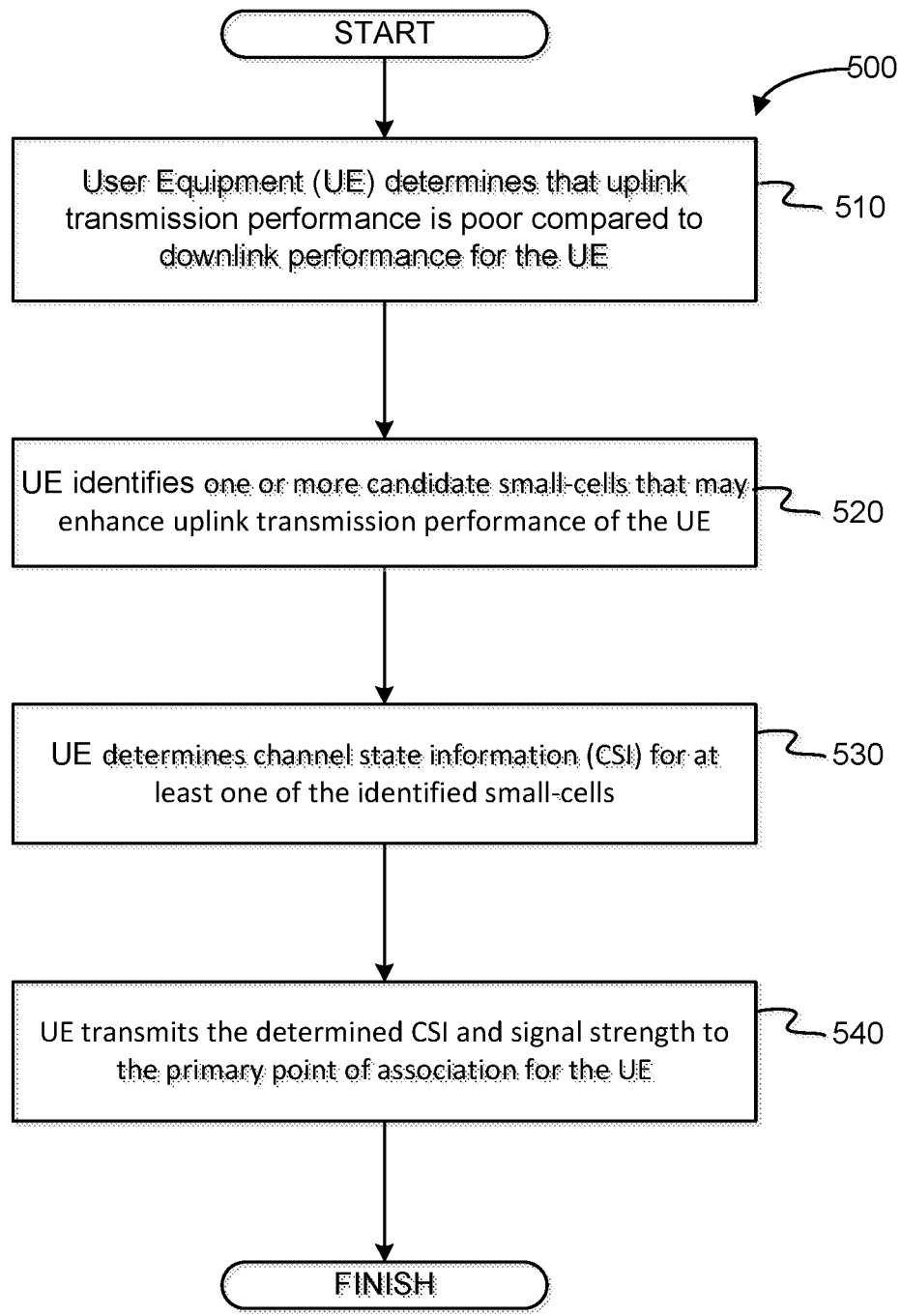
FIG. 5 illustrates a flowchart of an example method performed by user equipment to enhance transmissions, according to an embodiment.

FIG. 5 is a flow diagram 500 illustrating an example method performed by a UE to request a small-cell to relay signals, as used in an embodiment. Beginning in block 510, the UE determines that uplink transmission performance is poor compared to downlink performance from a primary point of association for the UE. The UE may determine that the uplink data performance is poor in comparison to downlink performance based on a measurement of the bitrate of data transmitted and received by the UE. The determination that uplink data transmission performance is poor in comparison to downlink performance may indicate that the signal received from a base station is strong, but the signal from the UE is not strong enough to reach the base station. For example, the primary point of association for the UE may be a macro-cell with a strong transmission signal for downlink communications, but that is too far away to consistently receive a signal that was transmit by the UE. In some embodiments, the UE may determine that a small-cell may improve uplink transmission performance based on other metrics. In some embodiments, the network may determine that the UE is to attempt to use a small-cell to enhance uplink performance instead of the UE. For example, the primary point of association for the UE may determine that the received signal strength is below a threshold value. The primary point of association may then generate a request for the UE to provide information about nearby small-cells that could potentially enhance the signal for the UE.

At block 520, the UE identifies one or more candidate small-cells that may enhance uplink transmission performance of the UE. For example, the UE may monitor signal strength for small-cells nearby the UE to determine if one or more of the small-cells are close enough to relay transmissions received from the UE to the primary point of association for the UE. The candidate small-cells may be identified as all nearby small-cells, or a subset of nearby small-cells based on selection criteria. For example, the UE may return only those nearby small-cells with a measured signal strength over a certain value or only those nearby small-cells with the highest measured signal strength.

At block 530, the UE determines CSI for at least one of the identified small-cells. For example, the UE may determine CSI for each of the candidate small-cells, for the candidate small-cell with the highest signal strength, or a subset of the candidate small-cells selected based on another set of criteria. Then, at block 540, the UE may transmit the determined CSI and signal strength of one or more candidate small-cells to the primary point of association for the UE. For example, the UE may transmit the CSI and signal strength of one or more candidate small-cells to a macro-cell that is the primary point of association for the UE. In some embodiments, the UE may transmit the CSI and signal strength to the macro-cell as part of a cell update message or a measurement report. The UE may also include an indication of a request to use a small-cell as a relay with the determined CSI and signal strengths. The primary point of association for the UE may then determine whether to request a small-cell to relay signals from the UE.

The UE may continue to transmit and receive uplink and downlink signals while the network determines whether to use a small-cell to relay signals from the UE. If the network begins using a small-cell to relay signals to a macro-cell, the UE may measure an increase in performance of uplink signals. If the network determines that it will not use a small-cell to relay signals, the UE may not measure an increase in performance. The UE may then re-transmit updated data indicating CSI and signal strength of nearby small-cells. In some embodiments, the UE may only send a request to use a relay once within a predetermined length of time. Thus, if a relay is not setup on an initial request from the UE, the UE may wait for a waiting period before sending another request.

Figure 6:
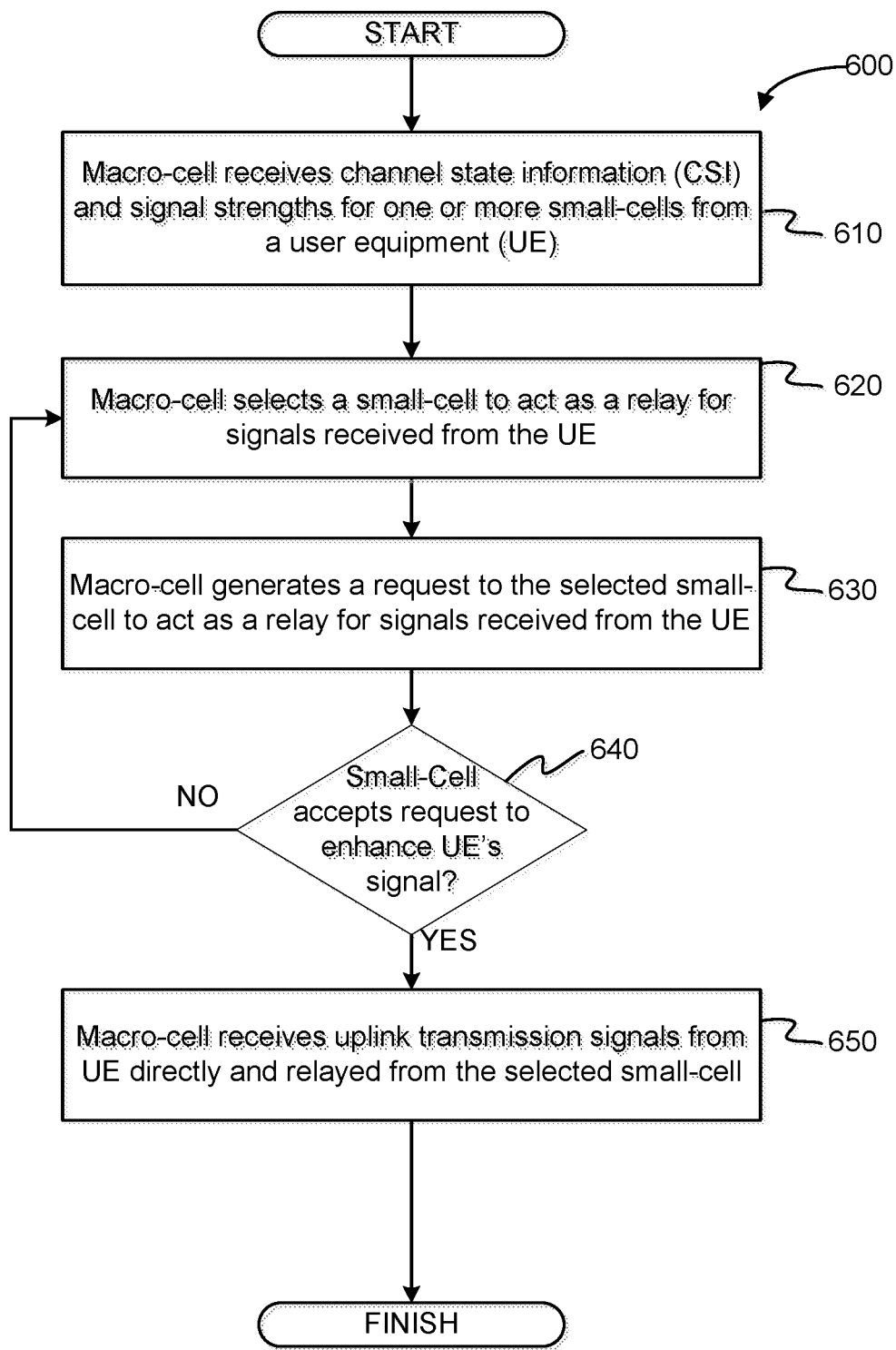
FIG. 6 illustrates a flowchart of an example method performed by a macro-cell base station to enhance transmissions for a UE, according to an embodiment.

FIG. 6 is a flow diagram 600 illustrating an example method performed by a macro-cell to request a small-cell to relay signals, as used in an embodiment. Beginning in block 610 the macro-cell receives CSI and signal strengths from one or more candidate small-cells from a UE. The macro-cell may receive the CSI and signal strengths with a request from the UE that the network use one of the small-cells to enhance uplink transmission from the UE.

At block 620, the macro-cell selects a small-cell to act as a relay for signal received from the UE. For example, the macro-cell may select a small-cell based on the small-cell to UE CSI, the small-cell to macro-cell CSI, full-duplex capabilities of the candidate small-cells, the measured signal strength of the small-cell, or based on other information. In some embodiments, the macro-cell may determine not to select a small-cell from the candidate small-cells. For example, if the macro-cell determines that the UE's uplink performance or signal strength has been at a threshold level such that use of a small-cell to enhance the UE's signal is not in the best interest of the network. In some embodiments, the small-cell may be in a different direction from the UE than the macro-cell and may not have a signal strength large enough to relay uplink signals to the macro-cell effectively.

At block 630, the macro-cell generates a request to the selected small-cell to act as a relay for signals received from the UE. In some embodiments, the request may include the UE's uplink scheduling information, the UE to macro-cell CSI, the small-cell to UE CSI, the small-cell to macro-cell CSI, and other information regarding the signals between the macro-cell, UE, and small-cell. The macro-cell may transmit the request to the UE through an x2 interface or another wired or wireless communication channel between the macro-cell and the small-cell. For example, another wired interface over the backhaul of the network components may be used.

At block 640 the macro-cell determines if the small-cell accepts the request to enhance the UE's signal. For example, the macro-cell may receive a communication from the small-cell that includes an indication that the small-cell accepted the request. If the small-cell rejects the request, (e.g., by not responding or by sending a rejection), the method may return to block 620, and the macro-cell may select another small-cell to act as a relay for signal received from the UE. In some embodiments, if a selected small-cell rejects the request, the macro-cell may not select another small-cell. In addition, if no candidate small-cells accept the request, the macro-cell may not select another small-cell. If the macro-cell does not accept the small-cell, then the method may end. If a small-cell does accept a request to enhance the UE's signal, the method may continue to block 650.

At block 650, the macro-cell receives uplink transmission signals from the UE directly and relayed from the selected small-cell. The macro-cell may receive the signals at a time and frequency allocated to the UE by the macro-cell. The signals may add constructively at a receiver of the macro-cell. In addition, the signal received from the small-cell may be received within the CP of the signals transmit by the UE. Thus, the macro-cell may decode the received signals without experiences inter-signal interference of the two signals. The method in FIG. 6 uses a single small-cell to enhance the signal from the UE. In some embodiments, the macro-cell may select more than one small-cell to relay signals from the UE. Thus, additional signals may be received by the macro-cell from additional small-cells. Each of the relayed signals may be amplified and filtered by corresponding small-cells such that the signals add constructively as they are received by the macro-cell.

Figure 7:
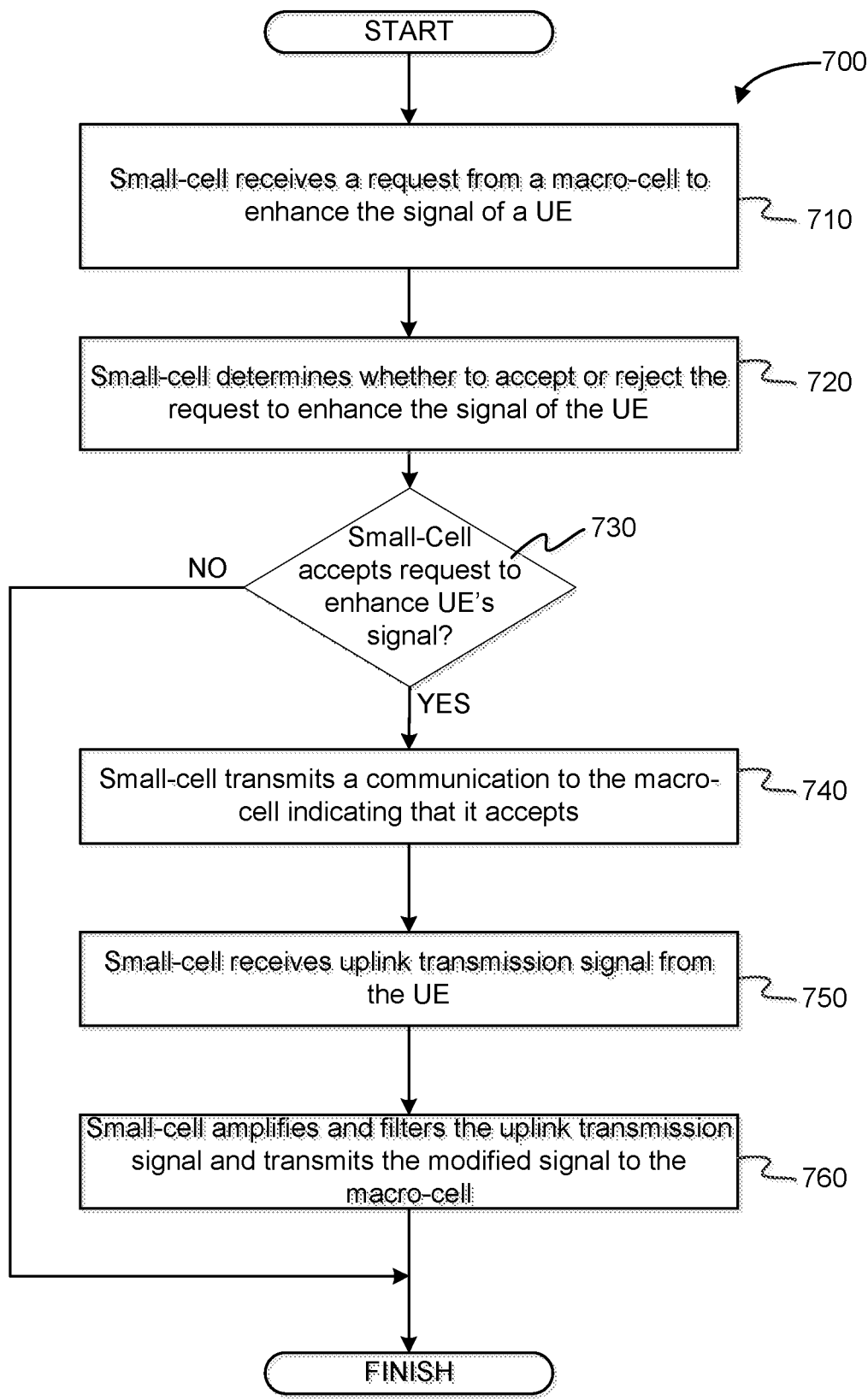
FIG. 7 illustrates a flowchart of an example method performed by a small-cell base station to enhance transmissions for a UE, according to an embodiment.

FIG. 7 is a flow diagram 700 illustrating an example method performed by a small-cell to enhance signals received from a UE, as used in an embodiment. Beginning in block 710 the small-cell receives a request from a macro-cell to enhance the signal of a UE. For example, the macro-cell may send the request as discussed with reference to FIG. 6 above. The signal may be received by a backhaul communication between the macro-cell and the small-cell. In some embodiments, the request may be sent as a wireless signal from the macro-cell to the small-cell.

At block 720, the small-cell determines whether to accept or reject the request to enhance the signal of the UE. For example, if the small-cell is operating near its available capacity, it may determine not to enhance the signal of the UE. In some embodiments, the macro-cell may not have information indicating the full-duplex relay capabilities of the small-cell. Thus, the small-cell may also determine not to enhance the signal of a UE based on not having the capability to perform the relay functionality. If the small-cell determines in block 730 not to accept the request to enhance the UE's signal, the method 700 may end. In some embodiments, the small-cell may transmit a notification to the macro-cell that the request is rejected. In some embodiments, the small-cell may ignore the request.

If the small-cell determines in block 730 to accept the request, the method may continue to block 740 for the small-cell to transmit a communication to the macro-cell indicating that it accepts the request. The message may include additional information regarding the small-cell. For example, the message may include CSI for communications between the UE and the small-cell. In addition the small-cell may send additional scheduling information to the macro-cell.

At block 750, the small-cell receives an uplink transmission signal from the UE. For example, the small-cell may receive an uplink transmission signal at a time and/or frequency scheduled for the UE by the macro-cell. Then, at block 760, the small-cell amplifies and filters the uplink transmission signal and transmits the modified signal to the macro-cell. For example, the small-cell may amplify and filter the signal from the UE such that it will be received at the macro-cell in a manner to add constructively with signals received directly from the UE. The small-cell may amplify and filter the signal as discussed above. The small-cell may continue to receive signals from the UE and transmit the modified signals to the macro-cell. For example, the small-cell may continue to act as a relay for uplink signals from the UE until the UE is no longer connected to the macro-cell, until the UE transitions into a state where it is not transmitting information, or until it moves further from the small-cell and the uplink transmission signal is no longer effectively relayed. The macro-cell may then send a transmission to the small-cell indicating that it is no longer to act as a relay for the UE. The small-cell may then release resources reserved for the UE and schedule other UEs to the assigned time and/or frequency.

Figure 8B:
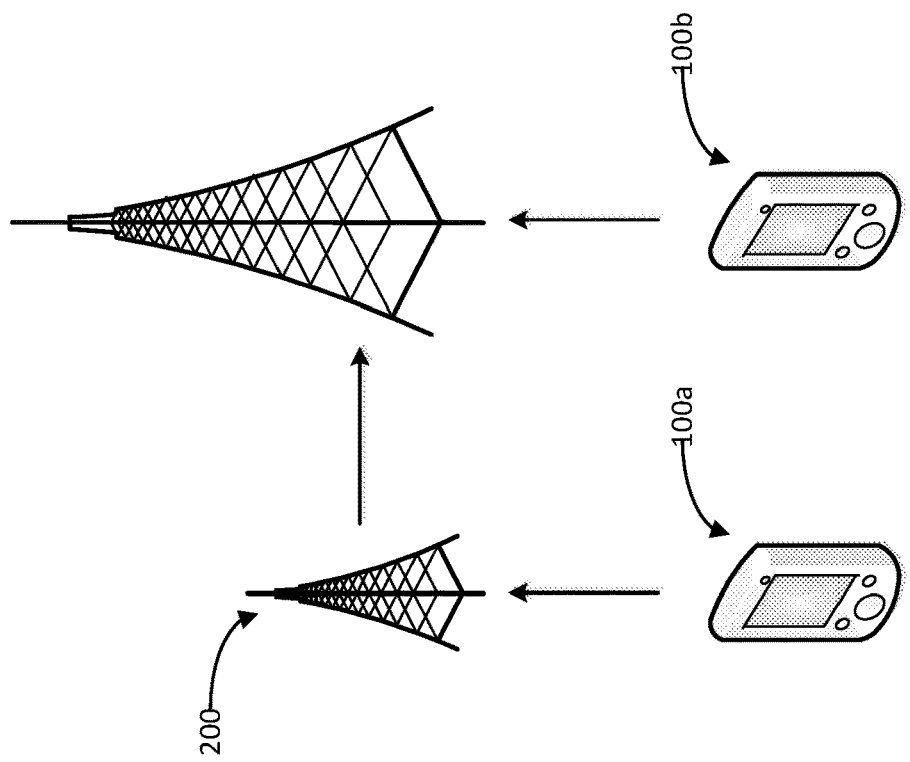
FIGS. 8a and 8b are block diagrams illustrating components and communications of a network, according to an embodiment.
Figure 8A:
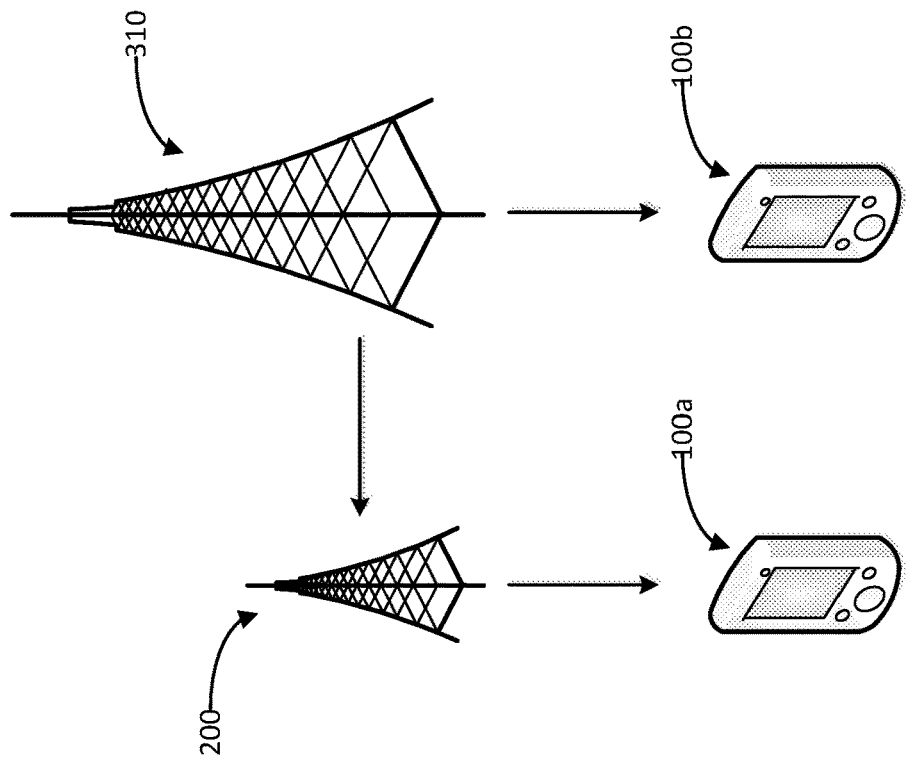

FIGS. 8a and 8b are diagrams illustrating communications by UEs 100, a small-cell 200, and a macro-cell 310 to provide over the air communications between a small-cell 200 and a macro-cell 310. For example, instead of sending wired backhaul signals to setup and maintain a small-cell 200 as a relay for a UE 100a, the macro-cell 310 may send over the air communications to small-cell 200. Over the air communication may be faster and experience fewer processing delays compared to a wired backhaul connection. For example, in FIG. 8a, the small-cell 200 may use its full duplex functionality to transmit signals to a connected UE 100a at the same time that it is receiving signals from the macro-cell 310. Thus, the macro-cell 310 may schedule the small-cell 200 at a frequency and time that the macro-cell 310 may also use to transmit downlink signals to other UEs. The small-cell 200 may then receive the signals from the macro-cell 310 at the same time and frequency that it transmits signals to a connected UE 100a. Such signals from the macro-cell 310 to the small-cell 200 may include requests to assist as a relay for a UE, CSI information for the macro-cell 310, ending the operation of the small-cell 200 as a relay, or the like.

Additionally, the small-cell 200 may send transmissions to the macro-cell 310 using over the air communications. For example, in FIG. 8b, the small-cell 200 may receive signals from a UE 100a at a particular time and/or frequency and also transmit signals to the macro-cell 310 at the same time and/or frequency. Using the communications shown in FIGS. 8a and 8b, the small-cell 200 may receive signal from the macro-cell 310 at times when it is sending downlink signals to a UE 100a connected to the small-cell 200 and transmit signals to the macro-cell 310 at times when it is receiving uplink signals from a UE 100a. Therefore, the communications to and from the macro-cell 310 do not reduce the capacity of the small-cell 200. In addition, the macro-cell 310 may schedule a UE 100*b* that is connected to the macro-cell 310 at the same time and/or frequency used to transmit messages to the small-cell 200. The macro-cell may then determine whether to transmit to the UE 100*b* or the small-cell 200 during the scheduled time.

While the present disclosure describes a number of embodiments, those skilled in the art will appreciate numerous modifications and variations therefrom. It is intended that the appended claims cover all such modifications and variations as fall within the true spirit and scope of this present disclosure.

The following examples pertain to further embodiments of the disclosure.

Example 1 is an apparatus of a base station comprising: a memory device; and a processing device operatively coupled to the memory device, the processing device to: process a request message received at the base station from a macro-cell, the message comprising a request to act as a relay for a user equipment (UE); determine that the base station is to act as the relay for the UE based on processing the request message received at the base station; and generate a response message comprising an indication that the base station accepted the request to act as the relay for the UE.

In Example 2, in the apparatus of the base station of Example 1 or any of the Examples described herein, the message received at the base station further comprises scheduling information for the UE and channel state information (CSI) for the UE; and the processing device is to determine that the base station is to act as the relay for the UE based on the scheduling information and CSI for the UE.

In Example 3, in the apparatus of the base station of Example 1 or any of the Examples described herein the processing device is to determine that the base station is to act as the relay for the UE based on an available capacity of the base station.

In Example 4, in the apparatus of the base station of Example 1 or any of the Examples described herein the processing device is to determine an amplification and a phase shift to apply to signals received from the UE based on CSI for the UE.

In Example 5, the apparatus of the base station of Example 1 or any of the Examples described herein further comprises radio frequency circuitry coupled to the processing device; and front-end module circuitry coupled to the radio frequency circuitry, wherein the front-end module circuitry is to amplify and filter signals received from the UE.

In Example 6, the apparatus of the base station of Example 4 or any of the Examples described herein further comprises a full-duplex antenna coupled to the front-end module to transmit the amplified and filtered signals.

In Example 7, in the apparatus of the base station of Example 4 or any of the Examples described herein the processing device is further to calibrate the front-end circuitry based on CSI for the UE and CSI for the base station.

In Example 8, in the apparatus of the base station of Example 4 or any of the Examples described herein the front-end module is to amplify and filter signals received from the UE within the cyclic prefix of a network.

In Example 9, in the apparatus of the base station of Example 1 or any of the Examples described herein the processing device is to schedule communications to a second UE at a time and a frequency at which the base station is to receive transmissions from the macro-cell.

In Example 10, in the apparatus of the base station of Example 1 or any of the Examples described herein, the processing device is further to receive the request message through an X2 interface and cause the response message to be transmit through the X2 interface.

Example 11 is one or more non-transitory computer-readable media having instructions that, when executed, cause a processing device of a base station to: process a request to enhance communications for a user equipment (UE), wherein the request includes channel state information (CSI) for at least one small-cell in range of the UE; determine to use a small-cell as a relay based on the received request; and generate a message to transmit to the small-cell, the message comprising a request to act as the relay for the UE.

In Example 12, in the one or more non-transitory computer-readable media of Example 11 or any of the other Examples described herein, the instructions further cause the processing device of the base station to: cause the message to be transmit to the small-cell;

receive an indication that the small-cell rejected the request to act as the relay for the UE; determine to use a second small-cell as the relay based on the received request; and generate a second message to transmit to the second small-cell, the second message comprising a request to act as the relay for the UE.

In Example 13, in the one or more non-transitory computer-readable media of Example 11 or any of the other Examples described herein, the instructions further cause the processing device of the base station to: receive an indication that the small-cell accepted the request to act as the relay for the UE; and generate a second message to transmit to the small-cell, the second message comprising scheduling information for the UE.

In Example 14, in the one or more non-transitory computer-readable media of Example 11 or any of the other Examples described herein, the instructions to cause the processing device of the base station to determine to use a small-cell as the relay further cause the processing device of the base station to: determine that the small-cell has full-duplex capabilities; and determine that the small-cell has a signal strength above a threshold.

In Example 15, in the one or more non-transitory computer-readable media of Example 11 or any of the other Examples described herein, the instructions further cause the processing device of the base station to cause the message to be transmit to the small-cell through an X2 interface.

Example 16 is an apparatus of a user equipment (UE) comprising: a memory device; and a processing device, operatively coupled to the memory device, the processing device to: identify one or more candidate small-cells that may enhance uplink transmission performance of the UE; determine channel state information (CSI) and a measured signal strength for at least one of the identified small-cells; and cause the UE to transmit the determined CSI and measured signal strength to a primary point of association for the UE.

In Example 17, in the apparatus of Example 16 or any of the other Examples described herein the processing device is to identify the one or more candidate small-cells in response to determining that an uplink transmission performance is below a threshold level.

In Example 18, in the apparatus of Example 16 or any of the other Examples described herein the processing device is to set the threshold level based on a measured downlink transmission performance.

In Example 19, the UE of Example 16 or any of the other Examples described herein further comprises radio frequency circuitry coupled to the processing device; front-end module circuitry coupled to the radio frequency circuitry; and an antenna coupled to the front-end module circuitry.

Example 20 is an apparatus of a base station comprising: means for processing a request message received at the base station from a macro-cell, the message comprising a request to act as a relay for a user equipment (UE); means for determining that the base station is to act as the relay for the UE based on processing the request message received at the base station; and means for generating a response message comprising an indication that the base station accepted the request to act as the relay for the UE.

In Example 21, the apparatus of the base station of Example 20 or any of the other Examples described herein, further comprises means for determining scheduling information for the UE and channel state information (CSI) for the UE; and means for determining that the base station is to act as the relay for the UE based on scheduling information and CSI for the UE.

In Example 22, the apparatus of the base station of Example 20 or any of the other Examples described herein, further comprises means for determining an amplification and a phase shift to apply to signals received from the UE based on CSI for the UE.

In Example 23, the apparatus of the base station of claim 20 or any of the other Examples described herein, further comprising further comprising means for transmitting the response message to a macro-cell through an X2 interface.

In Example 24, the apparatus of the base station of Example 20 or any of the other Examples described herein, further comprises means for amplifying and filtering signals received from the UE within the cyclic prefix of a network.

In Example 25, the apparatus of the base station of Example 20 or any of the other Examples described herein further comprises means for providing in-band full-duplex transmissions.

Example 26 is an apparatus of a base station comprising: a memory device; and a processing device operatively coupled to the memory device, the processing device to: process a request to enhance communications for a user equipment (UE), wherein the request includes channel state information (CSI) for at least one small-cell in range of the UE; determine to use a small-cell as a relay based on the received request; and generate a message to transmit to the small-cell, the message comprising a request to act as the relay for the UE.

In Example 27, in the apparatus of the base station of Example 26 or any of the other Examples described herein the processing device is further to cause the message to be transmit to the small-cell; receive an indication that the small-cell rejected the request to act as the relay for the UE; determine to use a second small-cell as the relay based on the received request; and generate a second message to transmit to the second small-cell, the second message comprising a request to act as the relay for the UE.

In Example 28, in the apparatus of the base station of Example 26 or any of the other Examples described herein, the processing device is further to: receive an indication that the small-cell accepted the request to act as the relay for the UE; generate a second message to transmit to the small-cell, the second message comprising scheduling information for the UE.

In Example 29, in the apparatus of the base station of Example 26 or any of the other Examples described herein, to determine to use a small-cell as the relay, the processing device is to: determine that the small-cell has full-duplex capabilities; and determine that the small-cell has a signal strength above a threshold.

In Example 30, the apparatus of the base station of Example 26 or any of the other Examples described herein, further comprises radio frequency circuitry coupled to the processing device; and front-end module circuitry coupled to the radio frequency circuitry, the front-end module circuitry to decode a first signal received from the UE and a second signal received from small-cell, wherein an antenna coupled to the front-end module is to combine constructively the first signal received from the UE and the second signal received from the small-cell.

In Example 31, in the apparatus of the base station of Example 26 or any of the other Examples described herein, further comprises the processing device is further to schedule communications to the small-cell at a time and a frequency for wireless communications.

Example 32 is a method comprising processing a request message received at a base station from a macro-cell, the message comprising a request to act as a relay for a user equipment (UE); determining that the base station is to act as the relay for the UE based on processing the request message received at the base station; and generating a response message comprising an indication that the base station accepted the request to act as the relay for the UE.

In Example 33, the method of Example 32 or any of the other Examples described herein further comprises determining scheduling information for the UE and channel state information (CSI) for the UE; and determining that the base station is to act as the relay for the UE based on scheduling information and CSI for the UE.

In Example 34, the method of Example 32 or any of the other Examples described herein further comprises determining an amplification and a phase shift to apply to signals received from the UE.

In Example 35, the method of Example 32 or any of the other Examples described herein further comprises calibrating front-end circuitry based on CSI for the UE and CSI for the base station.

In Example 36, the method of Example 32 or any of the other Examples described herein further comprises amplifying and filtering signals received from the UE within the cyclic prefix of an associated network.

Example 37 is an apparatus comprising means to perform a method according to any of Examples 32 to 36 or any of the other Examples described herein.

Example 38 is a machine-readable storage including machine-instructions that, when executed, cause an apparatus to perform a method of Examples 32 to 36 or any of the other Examples described herein.

Example 39 is an apparatus of a user equipment (UE) comprising: means for identifying one or more candidate small-cells that may enhance uplink transmission performance of the UE; means for determining channel state information (CSI) and a measured signal strength for at least one of the identified small-cells; and means for causing the UE to transmit the determined CSI and measured signal strength to a primary point of association for the UE.

In Example 40, the apparatus of the UE of Example 39 or any of the other Examples described herein further comprises means for determining that an uplink transmission performance is below a threshold level.

In Example 41, the apparatus of the UE of Example 39 or any of the other Examples described herein further comprises means for measuring signal strength from the one or more candidate small-cells, wherein the means for identifying one or more candidate small-cells is to identify the one or more candidate small-cells based on measured signal strength from the one or more candidate small-cells.

In Example 42, the apparatus of the UE of Example 29 or any of the other Examples described herein further comprises means for transmitting and receiving wireless communications from the one or more identified small-cells and the primary point of association for the UE.

Example 43 is a method comprising: processing a request message received at a base station from a macro-cell, the message comprising a request to act as a relay for a user equipment (UE); determining that the base station is to act as the relay for the UE based on processing the request message received at the base station; and generating a response message comprising an indication that the base station accepted the request to act as the relay for the UE.

In Example 44, the method of Example 43 or any of the other Examples described herein further comprises determining scheduling information for the UE and channel state information (CSI) for the UE; and determining that the base station is to act as the relay for the UE based on scheduling information and CSI for the UE.

In Example 45 the method of Example 43 or any of the other Examples described herein further comprises determining an amplification and a phase shift to apply to signals received from the UE.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focuses on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" on "in some embodiments" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. An apparatus, comprising:
   a memory device; and
   a processing device operatively coupled to the memory device, wherein the processing device is configured to:
      process a request message received at a base station from a macro-cell, wherein the request message comprises a request to act as an uplink relay for a user equipment (UE), scheduling information for the UE, and channel state information (CSI) for the UE, and wherein the macro-cell supports downlink transmissions to the UE;
      determine that the base station is to act as an uplink relay for the UE based on the scheduling information and CSI for the UE via processing of the request message; and
      generate a response message comprising an indication that the base station accepted the request to act as the relay for the UE.

2. The apparatus of claim 1, wherein the processing device is further configured to determine that the base station is to act as the relay for the UE based on an available capacity of the base station.

3. The apparatus of claim 1, wherein the processing device is further configured to determine an amplification and a phase shift to apply to signals received from the UE based on CSI for the UE.

4. The apparatus of claim 1, further comprising:
radio frequency circuitry coupled to the processing device; and
front-end module circuitry coupled to the radio frequency circuitry, wherein the front-end module circuitry is configured to amplify and filter signals received from the UE.

5. The apparatus of claim 4, further comprising:
a full-duplex antenna coupled to the front-end module and configured to transmit the amplified and filtered signals.

6. The apparatus of claim 4, wherein the processing device is further configured to calibrate the front-end circuitry based on CSI for the UE and CSI for the base station.

7. The apparatus of claim 4, wherein the front-end module is further configured to amplify and filter signals received from the UE within a cyclic prefix of a network.

8. The apparatus of claim 1, wherein the processing device is further configured to schedule communications to a second UE at a time and a frequency at which the base station is to receive transmissions from the macro-cell.

9. The apparatus of claim 1, wherein the processing device is further configured to receive the request message through an X2 interface and cause the response message to be transmit through the X2 interface.

10. The apparatus of claim 1, wherein the processing device is further configured to transmit signals to the UE and receive signals from the macro-cell at the same time in a full duplex manner.

11. The apparatus of claim 10, wherein the processing device is further configured to transmit the signals to the UE through an over the air interface and receive the signals from the macro-cell through the over the air interface.

12. The apparatus of claim 1, wherein the processing device is further configured to receive the request message through an over the air interface and cause the response message to be transmit through the over the air interface.

13. One or more non-transitory computer-readable media having instructions that, when executed, cause a processing device of a base station to:
process a request to enhance communications for a user equipment (UE), wherein the request includes channel state information (CSI) for at least one small-cell in range of the UE, and wherein the base station supports downlink transmissions to the UE;
determine to use a small-cell as an uplink relay based on the request;
generate a first message to transmit to the small-cell, the first message comprising a request to act as the uplink relay for the UE; and
generate, in response to receiving an indication that the small-cell accepted the request to act as the uplink relay for the UE, a second message to transmit to the small-cell, the second message comprising scheduling information for the UE.

14. The one or more non-transitory computer-readable media of claim 13, wherein the instructions further cause the processing device of the base station to:
cause the first message to be transmit to the small-cell;
receive an indication that the small-cell rejected the request to act as the relay for the UE;
determine to use a second small-cell as the relay based on the received request; and
generate a third message to transmit to the second small-cell, the third message comprising a second request to act as the relay for the UE.

15. The one or more non-transitory computer-readable media of claim 13, wherein the instructions to cause the processing device of the base station to determine to use a small-cell as the relay further cause the processing device of the base station to:
determine that the small-cell has full-duplex capabilities; and
determine that the small-cell has a signal strength above a threshold.

16. An apparatus, comprising:
a memory device; and
a processing device, operatively coupled to the memory device, wherein the processing device is configured to:
identify one or more candidate small-cells that may enhance uplink transmission performance of a user equipment (UE) based on a measured signal strength from the one or more candidate small-cells in response to determining that an uplink transmission performance is below a threshold level, wherein the threshold level is based on a measured downlink transmission performance;
determine channel state information (CSI) and a measured signal strength for at least one of the one or more candidate small-cells;
cause the UE to transmit the determined CSI and measured signal strength to a primary point of association for the UE, wherein the primary point of association supports downlink transmissions to the UE;
after a predetermined length of time and in response to an uplink relay not being setup, re-determine CSI and a measured signal strength for at least one of the one or more candidate small-cells; and
cause the UE to transmit the re-determined CSI and measured signal strength to the primary point of association for the UE.

17. The apparatus of claim 16, further comprising:
radio frequency circuitry coupled to the processing device;
front-end module circuitry coupled to the radio frequency circuitry; and
an antenna coupled to the front-end module circuitry.

18. One or more non-transitory computer-readable media having instructions that, when executed, cause a processing device of a base station to:
process a request message received at the base station from a macro-cell, wherein the request message comprises a request to act as a relay for a user equipment (UE), scheduling information for the UE, and channel state information (CSI) for the UE, and wherein the macro-cell supports downlink transmissions to the UE;
determine that the base station is to act as an uplink relay for the UE based on the scheduling information and CSI for the UE via processing of the request message; and
generate a response message comprising an indication that the base station accepted the request to act as the relay for the UE.

19. The one or more non-transitory computer-readable media of claim 18, wherein the instructions further cause the processing device to:
   determine that the base station is to act as the relay for the UE based on an available capacity of the base station.

20. The one or more non-transitory computer-readable media of claim 18, wherein the instructions further cause to processing device to:
   determine an amplification and a phase shift to apply to signals received from the UE based on CSI for the UE.

* * * * *